Dec. 30, 1958
W. R. COYNE
2,866,690
METHOD AND APPARATUS FOR MAKING
MOISTURE CONTENT DETERMINATIONS
Filed July 8, 1955
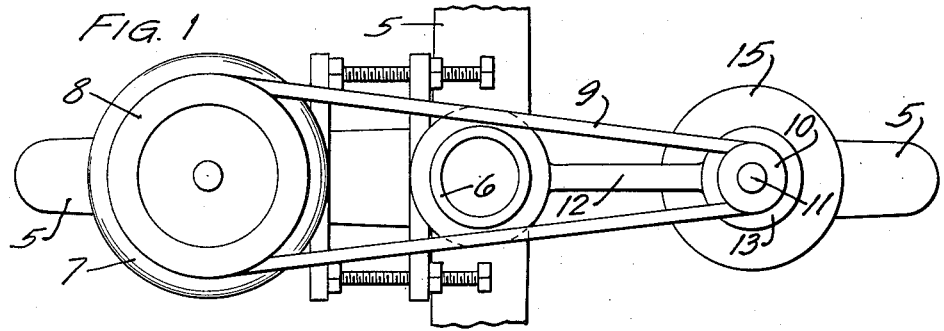
FIG. 1
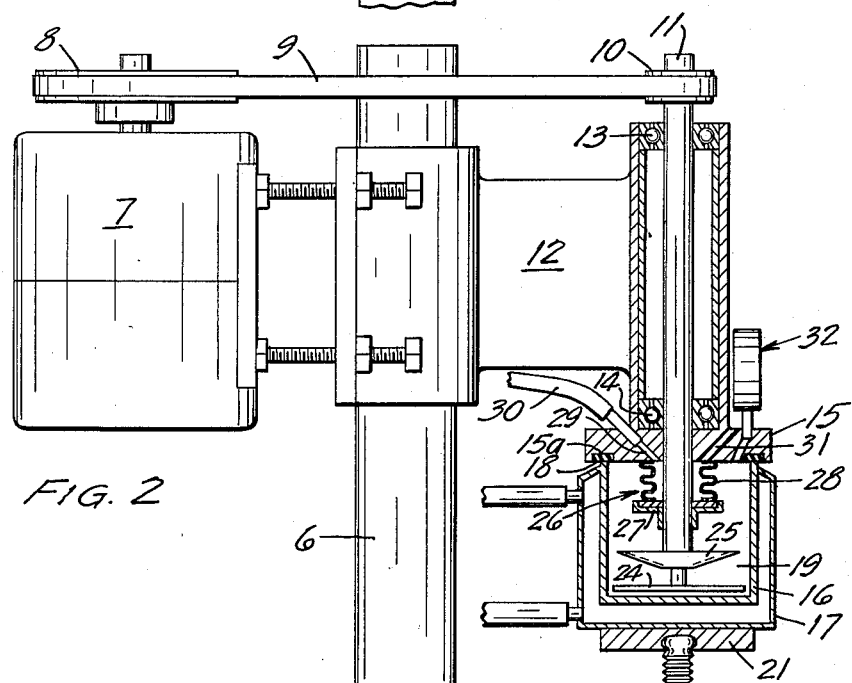
FIG. 2
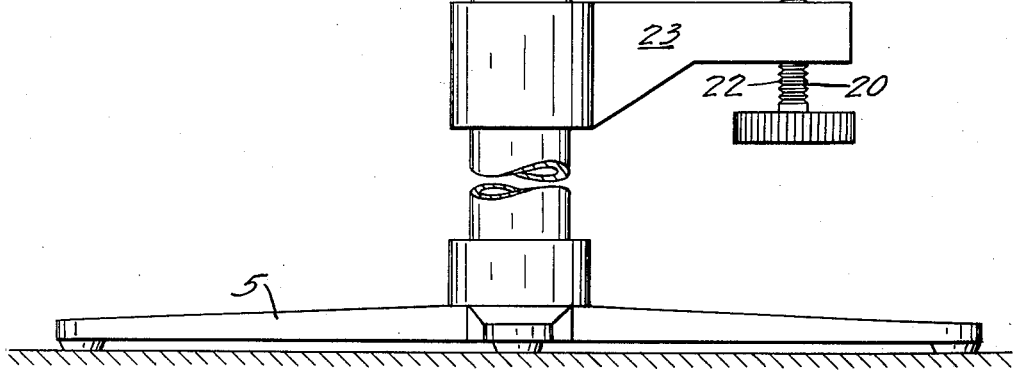
INVENTOR
WILLIAM R. COYNE
BY
Williamson, Schroeder, Adams + Meyers
ATTORNEYS United States Patent Office 2,866,690
Patented Dec. 30, 1958

2,866,690

METHOD AND APPARATUS FOR MAKING MOISTURE CONTENT DETERMINATIONS

William R. Coyne, Minneapolis, Minn.

Application July 8, 1955, Serial No. 520,677

6 Claims. (Cl. 23—253)

This invention relates to apparatus for testing the moisture content of materials. More particularly it relates to apparatus especially designed for determining the moisture content of grain kernels such as wheat, etc.

Most wheat, when received in carload lots by the miller, is unfit for milling in that it has only about an 8 percent moisture content. Such wheat must be first tempered by the plant operators preparatory to the milling operation by adding moisture thereto in order to raise the moisture content to approximately 15.5 percent. Immediately prior to the milling operation, it is conventional to take samples of the grain to determine the moisture content in order to properly adjust the milling machinery and give last-minute treatment to the grain to place it in optimum condition for efficient milling. In the use of methods and apparatus heretofore known, the sample of grain has been oven-dried and the loss of moisture is determined by weighing to give the moisture content of the grain. This procedure is very slow and tedious and the results from the same sampling often vary because of the inherent difficulties in making such a determination. Such determinations often vary from .4 to .5 of one percent.

In addition to the above, it is highly desirable in the milling industry to be able to make a quick determination of the moisture content of a sample of wheat. Such information is valuable in determining the prices which are to be paid in the purchase of wheat supplies. Also, it is extremely helpful to be able to make quick and accurate determinations so that machinery may be adjusted during the milling operation to compensate for an undesirable condition of the wheat. My invention is directed toward eliminating the above disadvantages.

It is a general object of my invention to provide novel and improved methods and apparatus for determining the moisture content of granular materials.

A more specific object is to provide novel and improved methods and apparatus for determining the moisture content of granular materials which will greatly shorten the amount of time required for making such a determination.

Another object is to provide novel and improved methods and apparatus for determining the moisture content of materials such as wheat wherein the material is in a kernel or other non-comminuted state.

Another object is to provide novel and improved methods and apparatus for determining the moisture content of materials such as wheat or the like which will eliminate the loss of moisture normally caused by the grinding of such materials preparatory to making the determination and which will thereby substantially increase the accuracy of the determination.

Another object is to provide novel and improved methods and apparatus for making moisture content determinations of materials such as wheat through the use of an anhydrous substance such as calcium carbide.

Another object is to provide novel and improved apparatus which will simultaneously grind and add an anhydrous substance such as calcium carbide to the sample the moisture content of which is to be determined, and which will measure the moisture content by the volume of gas generated through the use of the anhydrous substance upon the sample.

Another object is to provide novel apparatus for making moisture content determinations of granular materials such as wheat which will substantially eliminate the effect of the heat generated through the action of an anhydrous substance upon the moisture within the sample.

These and other objects and advantages of my invention will more fully appear from the following description made in connection with the accompanying drawings, wherein like reference characters refer to the same or similar parts throughout the several views, and in which:

Fig. 1 is a plan view of one embodiment of my invention; and

Fig. 2 is a vertical sectional view of the device shown in Fig. 1 taken on an enlarged scale.

One embodiment of my invention, as shown in Figs. 1 and 2, may include a base member 5 having an upright standard 6 mounted thereupon and extending upwardly therefrom. Carried by this standard is an electric motor 7 with a drive pulley 8 which is connected by a belt 9 to a pulley 10. The pulley 10 is carried by a vertical shaft 11 which is rotatably mounted in a mounting bracket 12 which also is supported by the standard 6. Bearings 13 and 14 adapt the shaft 11 for rotation about its longitudinal axis. Secured to the lower end of the bracket 12 is a cover member 15 which is adapted to engage a cup-like member to be hereinafter described to cooperatively form a closed air-tight chamber.

Disposed beneath the cover member 15 is a cup member 16 the major portions of which are encircled by a water jacket 17 for the purpose of maintaining the interior of the cup at a constant temperature level. The upper edges of the cup are adapted to fit snugly into an annular groove 15a in the undersurface of the cover member and to engage a gasket 18 which is carried in that groove so that the interior 19 of the cup member constitutes a closed air-tight chamber when the upper edges of the cup member are forced against the gasket by the upward thrust of the screw-type clamp 20. As best shown in Fig. 2, this clamp 20 has a bearing plate 21 swiveled on the threaded shank portion 22 which threadably engages a mounting bracket 23 carried by the standard 6.

Mounted on the extreme lower end of the shaft 11 is a comminuter 24. This comminuter is preferably in the form of an elongated blade member secured to the lower end of the shaft for rotation therewith. Also carried by the shaft 11 and disposed slightly above the comminuter 24 is an imperforate pan member 25 which faces upwardly and is adapted to receive a substance such as calcium carbide therewithin whereby the calcium carbide may be maintained in spaced relation to the bottom of the cup member 16.

Encircling the shaft 11 within the cup member 16 is a sleeve member indicated generally as 26. The interior of this sleeve member is sealed to the underside of the cover member 15 and is sealed from the interior of the cup member 16 by a carbon seal disc 27. The sleeve member is preferably constructed in the form of a bellows as indicated by the numeral 28, and is made of a material which will conduct heat rapidly. A passage 29 connects the interior of the sleeve member 26 with a conduit 30 which is connected to a source of forced air (not shown). A discharge passage 31 is formed in the cover member 15 at opposite sides of the shaft 11 to permit the air which is forced into the interior of the sleeve member 26 to escape to the exterior and thereby rapidly transfer heat away from the gases formed within the cup.

member 16 by the reaction between the carbide and the moisture within the grain.

The interior of the closed container 19 is connected with a gauge indicated generally as 32. This gauge 32 is calibrated to interpolate the pressure generated within the cup member 16 into moisture content percentage for a sample of predetermined weight and reads between zero and twenty percent moisture content by tenths of one percent.

To utilize my methods and apparatus, a sample of wheat is first weighed out and deposited upon the bottom of the cup 16. A supply of calcium carbide is then placed within the pan member 25. For a 10 gram sample, about one teaspoonfull of powdered calcium carbide is sufficient for most determinations. It is important that sufficient calcium carbide be used so that there is enough of that chemical to react with every bit of moisture contained within the sample. It is impossible to use too much calcium carbide, for any excess has no effect on the results.

Thereafter the cup member 16 and the water jacket 17 are placed in the position shown in Fig. 2 so that the upper edge of the cup member fits into the annular groove 15a and engages the gasket 18. The screw clamp 20 is then tightened so that the bearing plate 21 will press the upper edge of the cup member tightly against the gasket so as to seal the interior of the cup member to thereby provide a closed air-tight container. The stream of water is commenced to flow through the water jacket 17 and the air is forced through the sleeve member 26. The motor 7 is then energized to cause the shaft 11 to rotate rapidly. The shaft rotates at approximately 9,500 R. P. M. When the shaft commences to rotate, the comminuter 24 which is traveling at the same speed as the shaft 11, immediately commences to comminute the kernels of wheat and at the same time the calcium carbide supply is flung outwardly beyond the pan 25 by centrifugal force. The calcium carbide drops downwardly and mixes thoroughly with the comminuted portions of the wheat kernels.

The intimate admixing of the calcium carbide and the pulverized wheat kernels through the action of the comminuter 24 causes all of the moisture content of the pulverized wheat kernels to react with the calcium carbide and form a gas. The volume of gas so produced is directly proportional to the amount of moisture present so that by measuring the total pressure resulting from the formation of this gas by the gauge 32, it is possible to accurately determine the moisture content of the sample by interpolation. The entire operation takes only about 1½ minutes and the moisture content of the sample can be read directly upon the gauge 32. Thereafter the clamp 20 is loosened and the cup member 16 may be wiped out and a new sample inserted for a second moisture content determination.

I have found by checking this device that the accuracy of determinations made through the utilization of my methods and apparatus are substantially more accurate than those previously made by weighing the loss of moisture resulting from a prolonged period of drying. The weighing and drying period previously required to make a moisture content determination was approximately 2 hours in contrast to the 1½ minute determination which can be made through the use of my methods and apparatus.

One reason for the determinations made through the utilization of my methods and apparatus being more accurate is because there is no moisture lost during the grinding operation. In other determinations it is necessary to grind the sample in order to get a sample of an accurate weight and in so doing, heat was generated by the grinding operation. This generation of heat causes a loss of moisture and therefore the results of the determination may be thrown off substantially. Through the use of my methods and apparatus, the grinding operation takes place only after the sample has been confined and therefore it is impossible for any moisture to be lost as a result of grinding for it is immediately acted upon by the calcium carbide.

It can be readily seen that through the use of my methods and apparatus, it is now possible to make a quick and accurate determination of the moisture content of a sample of wheat. Thus frequent checks can be made during the milling operation and the results may be utilized to perfect more efficient quality control of the milled product. Also in the purchase of wheat, it is possible to make quick and accurate tests to determine the moisture content of the wheat. In addition, immediately prior to the milling operation and during the milling operation, the wheat can be quickly and accurately checked to determine what additional conditioning prior to milling is needed, if any.

Whenever hereinafter the term "adequate supply of calcium carbide" is used, it is understood to indicate a sufficient supply so as to be more than adequate to act upon all of the moisture present within the sample. If the sample has a high moisture content, then of course slightly more calcium carbide should be added. It should be kept in mind, however, that there is no danger of utilizing too much calcium carbide and that so long as an adequate supply of calcium carbide is utilized, the results will be accurate.

It will, of course, be understood that various changes may be made in the form, details, arrangement and proportions of the various parts without departing from the scope of my invention.

What is claimed is:

1. In moisture content determining apparatus, a closed air-tight container having means for introducing into the interior thereof a supply of calcium carbide and a sample of predetermined weight of the material the moisture content of which is to be determined, and imperforate rotary mechanism arranged and constructed within said container to temporarily maintain the sample and the entire supply of the calcium carbide in vertically spaced relation while actuated and arranged and constructed to comminute the sample and intimately admix the same with the calcium carbide when actuated, and mechanism for measuring the pressure generated within said container through the mixing of the sample and calcium carbide therewithin wherefrom the moisture content of the sample may be readily determined by interpolation.

2. In moisture content determining apparatus, a closed air-tight container having means for introducing into the interior thereof a supply of calcium carbide and a sample of predetermined weight of the material the moisture content of which is to be determined, a shaft having one portion thereof extending into the interior of said container, said shaft being mounted for rotation about its longitudinal axis, an upwardly facing imperforate pan member carried by said shaft for rotation therewith within said container, said pan member being adapted to receive and temporarily maintain the calcium carbide in spaced relation to the sample while said shaft is not being rotated, mechanism for rapidly rotating said shaft to cause the calcium carbide carried by said pan member to intimately admix with the sample, and mechanism for measuring the pressure generated within said container through the mixing of the sample and calcium carbide therewithin wherefrom the moisture content of the sample may be readily determined by interpolation.

3. In moisture content determining apparatus, a closed air-tight container having means for introducing into the interior thereof a supply of calcium carbide and a sample of predetermined weight of the material the moisture content of which is to be determined, an upright shaft having one portion thereof extending into the interior of said container, said shaft being mounted for rotation about its longitudinal axis, an upwardly facing imperforate pan member carried by said shaft for rotation therewith, said pan member being adapted to receive the calcium carbide therein and maintain the same in spaced relation to the sample while said shaft is not being rotated, a comminuter mounted on said shaft for rotation therewith and being arranged and constructed to comminute the sample and to cause the comminuted sample and calcium carbide to be intimately admixed when said shaft is rotated, and mechanism for measuring the pressure generated within said container through the mixing of the sample and calcium carbide therewithin wherefrom the moisture content of the sample may be readily determined by interpolation.

4. In moisture content determining apparatus, a closed air-tight container having means for introducing into the interior thereof a supply of calcium carbide and a sample of predetermined weight of the material the moisture content of which is to be determined, an upright shaft having one portion thereof extending into the interior of said container, said shaft being mounted for rotation about its longitudinal axis, an upwardly facing pan member carried by said shaft for rotation therewith within said chamber, said pan member being adapted to receive and maintain the supply of calcium carbide in spaced relation to the sample while said shaft is not being rotated, means for rapidly rotating said shaft to cause the supply of calcium carbide to mix with the sample within said container, a heat-conducting sleeve member mounted on said shaft within said container and extending lengthwise thereof in encircling relation, the interior of said sleeve member being sealed off from the interior of said chamber, means for forcing air through said sleeve member to effect an efficient transfer of heat from the interior of said chamber to the exterior, and mechanism for measuring the pressure generated within said container through the mixing of the sample and calcium carbide therewithin wherefrom the moisture content of the sample may be readily determined by interpolation.

5. In moisture content determining apparatus, a closed air-tight container having means for introducing into the interior thereof a supply of calcium carbide and a sample of predetermined weight of the material the moisture content of which is to be determined, a vertical shaft having one portion thereof extending into the interior of said container, said shaft being mounted for rotation about its longitudinal axis, an upwardly facing imperforate pan member carried by said shaft for rotation therewith within said container, said pan member being adapted to receive and temporarily maintain the supply of calcium carbide in spaced relation to the sample within said container while said shaft is not being rotated, means for rotating said shaft to cause the calcium carbide to mix with the sample within said container, a water jacket encircling major portions of said container whereby the temperature of the interior of said container may be maintained at a relatively constant level, and mechanism for measuring the pressure generated within said container through the mixing of the sample and the calcium carbide therewithin wherefrom the moisture content of the sample may be readily determined by interpolation.

6. The structure defined in claim 5, a heat-conducting sleeve member mounted on said shaft within said container and extending longitudinally thereof in encircling relation, the interior of said sleeve member being sealed off from the interior of said chamber, and means for forcing air through said sleeve member to effect an efficient transfer of heat from the interior of said chamber to the exterior to aid in eliminating the heat generated through the action of the calcium carbide with the moisture content of the sample.

References Cited in the file of this patent

UNITED STATES PATENTS

| | | |
|---|---|---|
| 1,976,752 | Stanworth | Oct. 16, 1934 |
| 2,359,831 | Delmhorst | Oct. 10, 1944 |
| 2,362,396 | Parks | Nov. 7, 1944 |